United States Patent
Opfer

(10) Patent No.: US 6,722,959 B2
(45) Date of Patent: Apr. 20, 2004

(54) COMBINATION 2-PLANE CNC POSITIONING GRINDER WITH CNC POSITIONING DRILL

(75) Inventor: Mark Opfer, Pemberville, OH (US)

(73) Assignee: Glassline Corporation, Perrysburg, OH (US)

(*) Notice: Subject to any disclaimer, the term of this patent is extended or adjusted under 35 U.S.C. 154(b) by 0 days.

(21) Appl. No.: 10/104,145

(22) Filed: Mar. 22, 2002

(65) Prior Publication Data

US 2003/0181148 A1 Sep. 25, 2003

(51) Int. Cl.[7] ................................................. B24B 7/00
(52) U.S. Cl. .......................... 451/65; 451/58; 451/71; 451/66; 451/43; 451/70
(58) Field of Search ............................ 451/65, 58, 66, 451/71, 5, 43, 70; 369/13.17; 29/26 A

(56) References Cited

U.S. PATENT DOCUMENTS

| | | | |
|---|---|---|---|
| 4,698,088 A | | 10/1987 | Bando |
| 4,787,178 A | * | 11/1988 | Morgan et al. ................ 451/81 |
| 5,040,342 A | * | 8/1991 | McGuire et al. .............. 451/60 |
| 5,079,876 A | | 1/1992 | Zumstein |
| 5,216,844 A | * | 6/1993 | Tamburini et al. ............. 451/6 |
| 5,807,166 A | * | 9/1998 | Bando .......................... 451/43 |
| 5,810,642 A | * | 9/1998 | Bando ........................... 451/5 |
| 5,873,773 A | * | 2/1999 | Bando .......................... 451/70 |
| 5,909,906 A | * | 6/1999 | Bortolini .................... 29/26 A |
| 6,416,382 B1 | * | 7/2002 | Bavelloni ....................... 451/5 |

* cited by examiner

*Primary Examiner*—George Nguyen
(74) *Attorney, Agent, or Firm*—Emch, Schaffer, Schaub & Porcello Co., L.P.A.

(57) ABSTRACT

A glass plate tooling apparatus has independently driven loading and unloading tools which presents raw workpieces to, and removes finished workpieces from a centrally located machining station. The machining station holds the workpiece in a fixed orientation on first and second planes. Machine tools, such as a grinder apparatus and a drill apparatus are independently movable on the first plane to engage with and tool the workpiece. The machining station rotates to provide tool accessibility on a third plane.

13 Claims, 10 Drawing Sheets

COMBINATION 2-PLANE CNC POSITIONING GRINDER WITH CNC POSITIONING DRILL

BACKGROUND OF THE INVENTION

The invention is a glass plate fabrication machine suitable for performing two tooling functions on a workpiece fixed in a single machining station. Specifically, the machine described herein is designed to perform grinding and drilling operations on medium and small size parts.

Glass plate working machines are typified by U.S. Pat. No. 5,807,166 which discloses a machine having a rotational table, on which a glass plate is placed, and a working tool for engagement with the glass plate. The working tool is moved in the x-direction and the glass plate is rotated on the table to provide y-directional movement. Commonly a preprogrammed numerical controlled PC (CNC) is used to control the operation of the moving working tool and the revolving table. Machines of this type have distinct limitations. Only one type of working tool can be positioned for engagement with the workpiece. If an operation requires two or more steps, such as grinding, and secondly drilling, then the machine must be shut down to unload the grinder and load the drill apparatus. This requires additional manpower and/or further automation costs and slows production. Also, if the machine is intended for working multiple workpieces having differing shapes and sizes, the machine must be shut down and setup to meet the distinct requirements of each type of workpiece.

Other machines such as that shown in U.S. Pat. No. 4,698,088 provide a glass plate fabrication machine having at least two work stations for performing operations on a glass sheet. The machine incorporates a transportation system to move the workpiece between tooling stations. While a machine of this type provides for greater ease of changeover between glass articles to be worked, the machine has other drawbacks in that it requires complicated transportation and orienting devices. The provision of separate work stations within a given machine creates a large footprint which negatively affects the ability to insert the machine in many confined manufacturing spaces.

The present invention provides a machine designed for custom manufacturers of multiple and varied workpieces requiring multiple changeovers of tooling. The machine of this invention provides for less product movement within the machine and requires no tool change between grinding and drilling operations, thus providing higher yields of manufacturing. The present invention can provide for one or two pair of drill combinations which provide up to two different hole sizes without the need for tool changes. The drills and the grinder are CNC positioned, thus, the ability to grind and drill differing parts with differing numbers of holes is not limited.

The present invention further provides for a highly accurate automatic referencing system and automatic load and unload shuttles to allow the invention to be integrated into a complete manufacturing line.

It is an object of the invention to provide for the automatic setup from part-to-part for similar part sizes and hole sizes by preprogramming.

It is yet another object of the invention to quickly move parts between grinding and drilling operations and provide for high speed grinding and virtually unlimited drilling capacities.

DETAILED DESCRIPTION OF THE INVENTION WITH REFERENCE TO THE DRAWINGS

Figure 1:
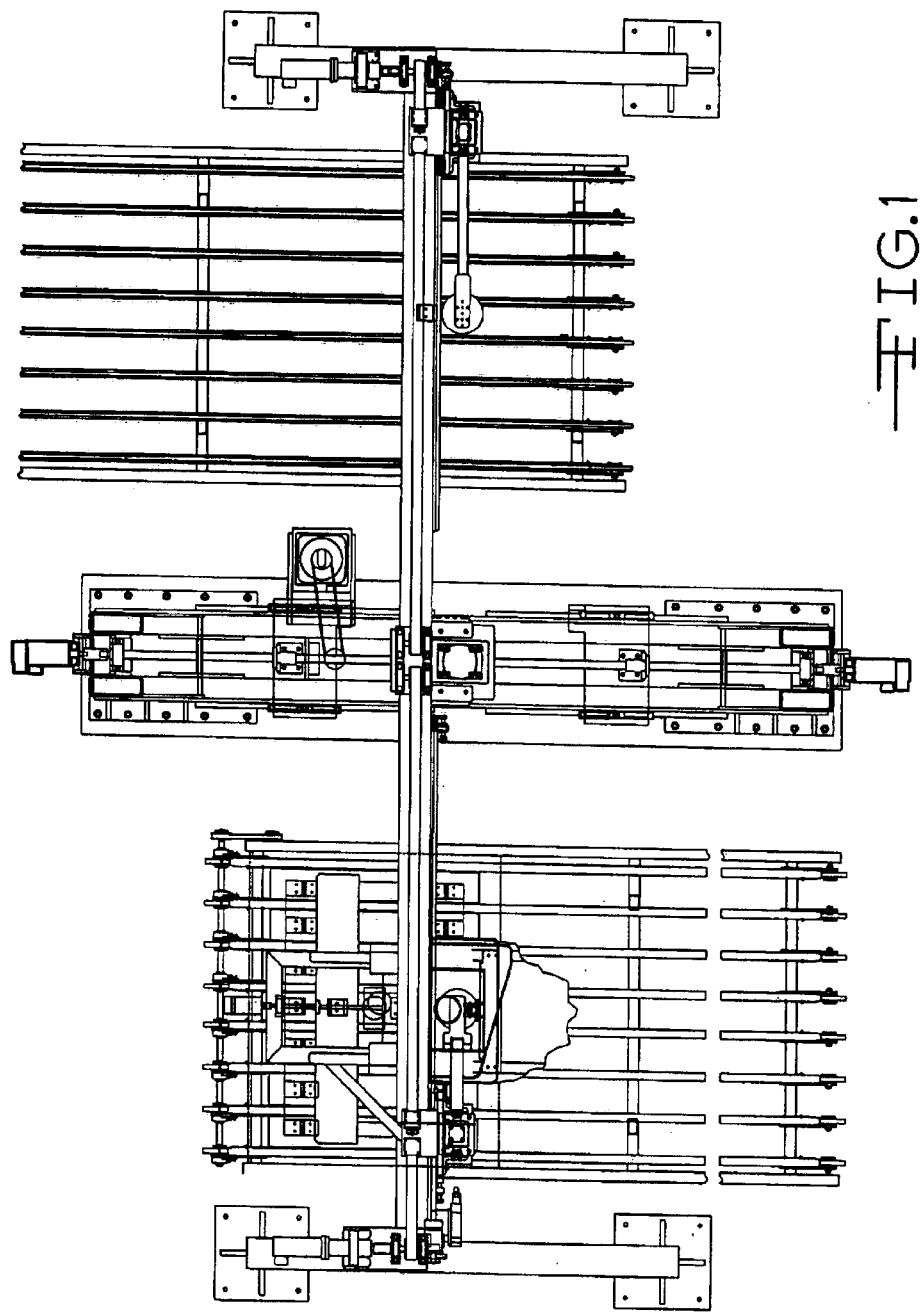
FIG. 1 is a top plan view of the grinding/drilling machine according to this invention.
Figure 2:
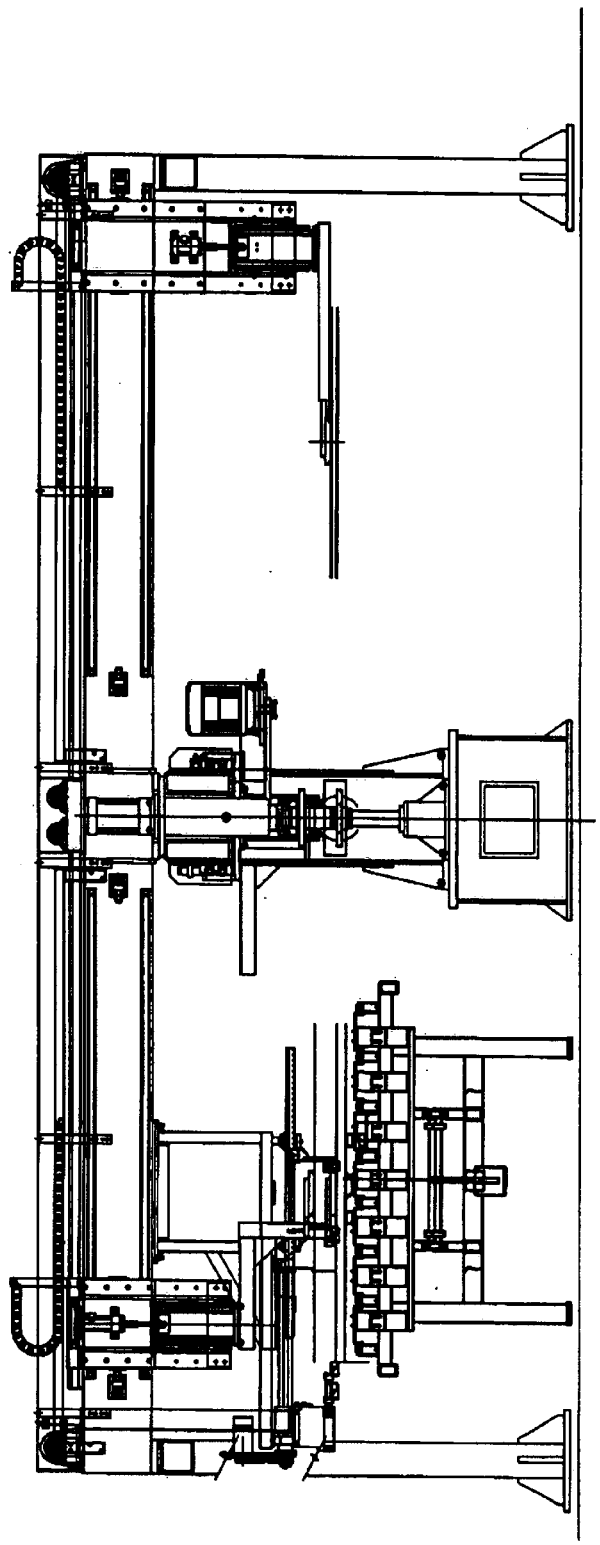
FIG. 2 is a front elevational view of the machine of FIG. 1.

The grinding and drilling apparatus of this invention includes a shuttle frame (10) for loading and unloading a workpiece such as a glass plate and for transporting the workpiece to a position proximate the grinder/drill frame (11). Preferably, both the shuttle frame (10) and the grinder/drill frame (11) are fabricated from heavy structural steel to insure ruggedness and rigidity. Referring to FIGS. 1 and 2, the shuttle frame (10) includes a pair of shuttle frame legs (12) with a shuttle frame bridge (13) extending between the shuttle frame legs (12). A first precision linear motion slide (14) is mounted to the outside surface of the shuttle frame bridge (13) and extends from a position proximate the first shuttle frame leg (12) to a position proximate the grinder/drill frame (11). A second precision linear motion slide (15) is also mounted on the outside surface of the shuttle frame bridge (13) extending from a position approximately opposing shuttle frame leg (12) to a location proximate the grinder/drill frame (11). A loading shuttle (16) is engaged with the first precision linear motion slide (14) for movement thereon. The loading shuttle (16) is preferably engaged to be driven by an AC servo motor (70) coupled to a timing belt drive (71). The timing belt (71) is coupled to the loading shuttle (16) by belt coupling (72).

Still referring to FIGS. 1 and 2, an unloading shuttle (17) is engaged with the second precision linear motion slide (15) for movement thereon. The drive mechanism for the unloading shuttle (17) is similar to that of the loading shuttle (16). The linear motion of the unloading shuttle (17) is controlled by an AC servo motor (73) coupled to a second timing belt drive (74). The second timing belt (74) is coupled to the shuttle (17) by a second belt coupling (75). In the preferred embodiment, the two linear motion slides (14, 15) are covered by a pan or guard arrangement (not shown) to protect the slide from contaminates.

Figure 1A:
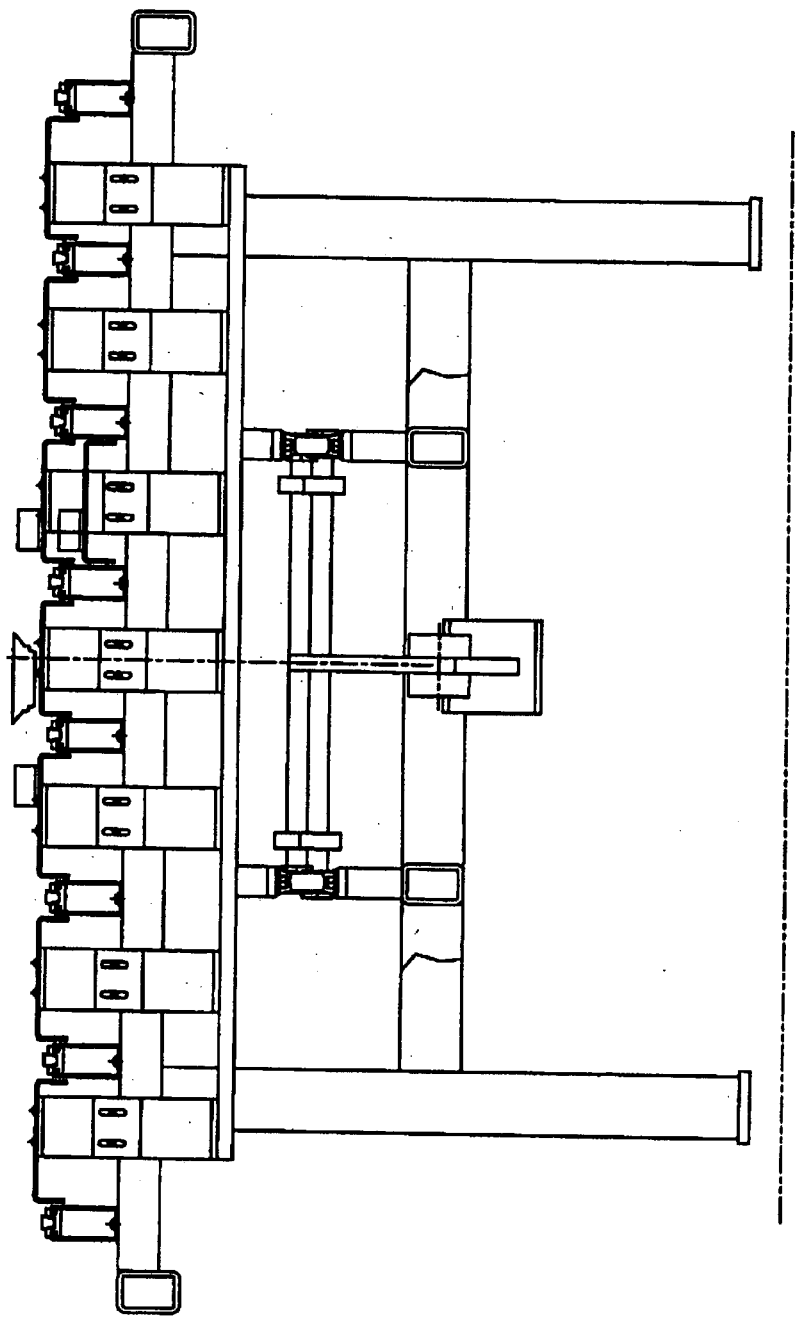
FIG. 1A is a front elevational view of the loading conveyor of the machine of FIG. 1.

Referring to FIGS. 1 and 1A, a strip belt conveyor (18) is provided to deliver work-pieces to the loading shuttle (16). A plate member (19), located beneath the belts (76) of the strip conveyor, is engaged with an air cylinder (77) and bell crank (78) for vertical movement with respect to the conveyor (18). In the preferred embodiment, the bell crank consists of a four-bar linkage. Bearing surfaces (20) are fixed to the plate member (19) and are located between the belts (76) of the conveyor (18). The plate member (19) and bearing surfaces (20) lift vertically with respect to the strip belt conveyor (18), when powered by the air cylinder (77) and bell crank (78), to extend the bearing surfaces (20) above the belts (76) to engage the workpiece. Preferably, the bearing surfaces (20) are fitted with 3M Brushlom® material to provide a scratch resistance bearing surface.

A vacuum cup (21) is located proximate the center of the plate member (19) and extends above the bearing surface (20). The vacuum cup (21) is engaged to a pneumatic guide mechanism (unshown) which provides the cup (21) with limited movement along the X plane and the Y plane. The vacuum cup (21) engages the workpiece and operates to position the work piece along the Y plane and the X plane to engage stops, thereby placing the workpiece in a predetermined referenced position.

The stops are located on the loading shuttle (16). Referring to FIGS. 1 and 2, the loading shuttle (16) includes a frame member (22) which extends below the loading shuttle (16) to a position adjacent the strip belt conveyor (18). The frame includes an adjustable X plane stop bracket (23) and an adjustable Y plane stop bracket (24). The stop brackets (23, 24) each include a ball screw and linear guide (not shown) which operates to position the stop brackets (23, 24) in a predetermined position to engage a workpiece entering the machine on the strip belt conveyor (18). Each bracket (23, 24) includes a pneumatic cylinder (not shown) which extends and retracts the brackets (23, 24) during workpiece entry to accurately reference the workpiece. Preferably, the stops (23, 24) are air sensors that are designed to sense the glass pressure against the stop.

Figure 3:
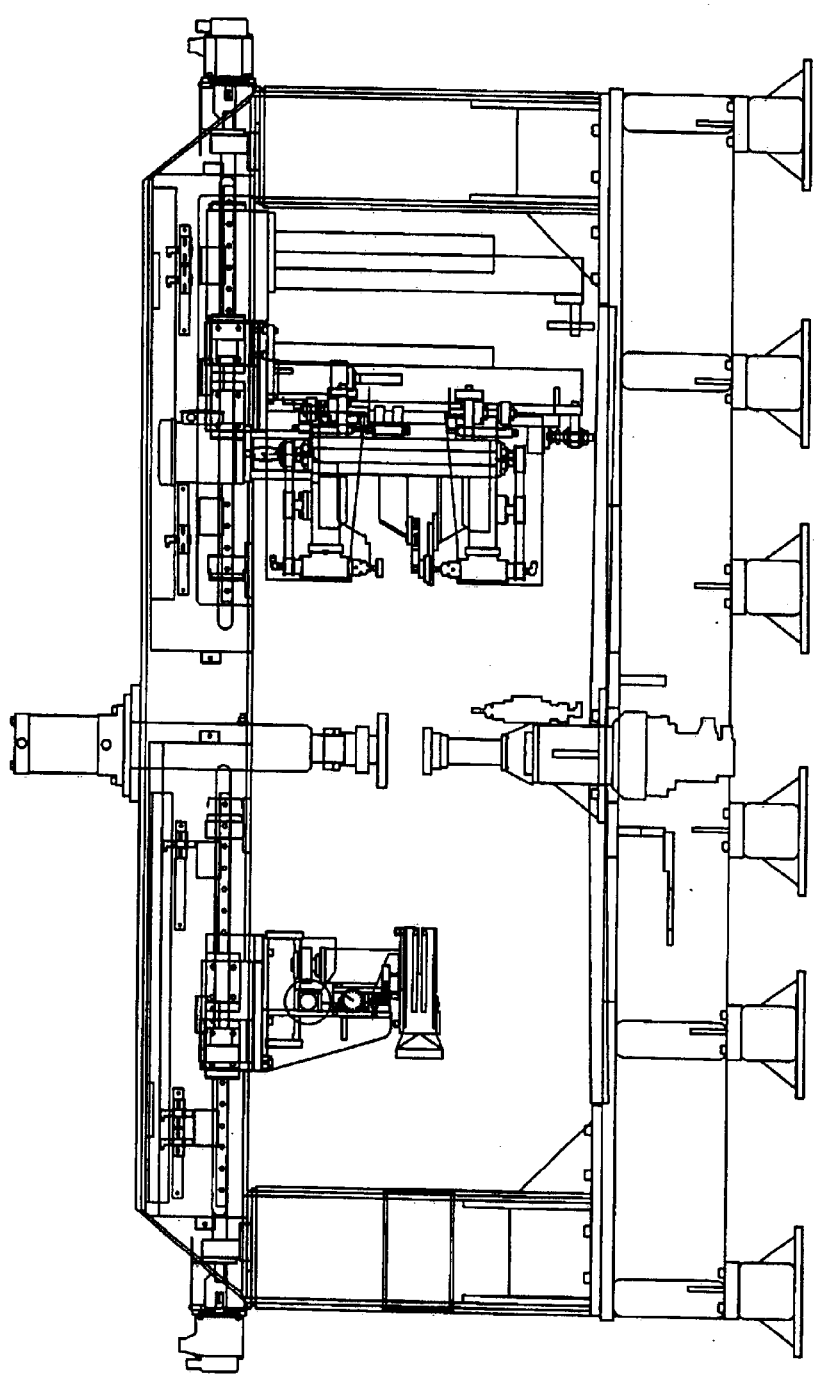
FIG. 3 is a side elevational view of the grinder/drill carriage assembly of the machine of FIG. 1.

The loading shuttle (16) retrieves the workpiece after it is positioned by the stops (23, 24). Preferably, the loading shuttle includes a vacuum pick up unit (25) that is actuated by an air cylinder (26) for raising and lowering the pick up unit (25). The unloading shuttle (17) is similar in structure to the loading shuttle and also includes a vacuum pick up (27) operated by an air cylinder (28). Optionally, the unloading shuttle (17) may be fitted with a rotation apparatus to facilitate reorientation of the workpiece as required for downstream operations. The loading shuttle (16) and unloading shuttle (17) operate independently. Once a workpiece has been positioned against the stops (23, 24), the vacuum pick up (27) is lowered into engagement with the workpiece and the workpiece is raised upward off of the conveyor (18). The loading shuttle then operates to move the workpiece to a position over the grind table (29), as shown in FIG. 3, where the workpiece chuck (30) engages the workpiece in its properly referenced position for the tooling operations. After the tooling operations are finished, the unloading shuttle (17) engages the workpiece and removes it to the unloading conveyor (31). In the preferred embodiment, the unloading shuttle (17) includes a cantilevered arm (32) extending from its carriage (33) such that both the unloading shuttle (17) and the loading shuttle (16) may be positioned over the grind table (29) at the same time with the loading shuttle (16) positioned higher than the unloading shuttle (17). After the tooling operations are complete, the unloading shuttle (17) picks up the finished workpiece to remove it toward the unloading conveyor (31). As soon as the finished workpiece clears the grind table, the load shuttle (16), vacuum cup (21) lowers a subsequent workpiece to the grind table (29) for continued operations.

Figure 4:
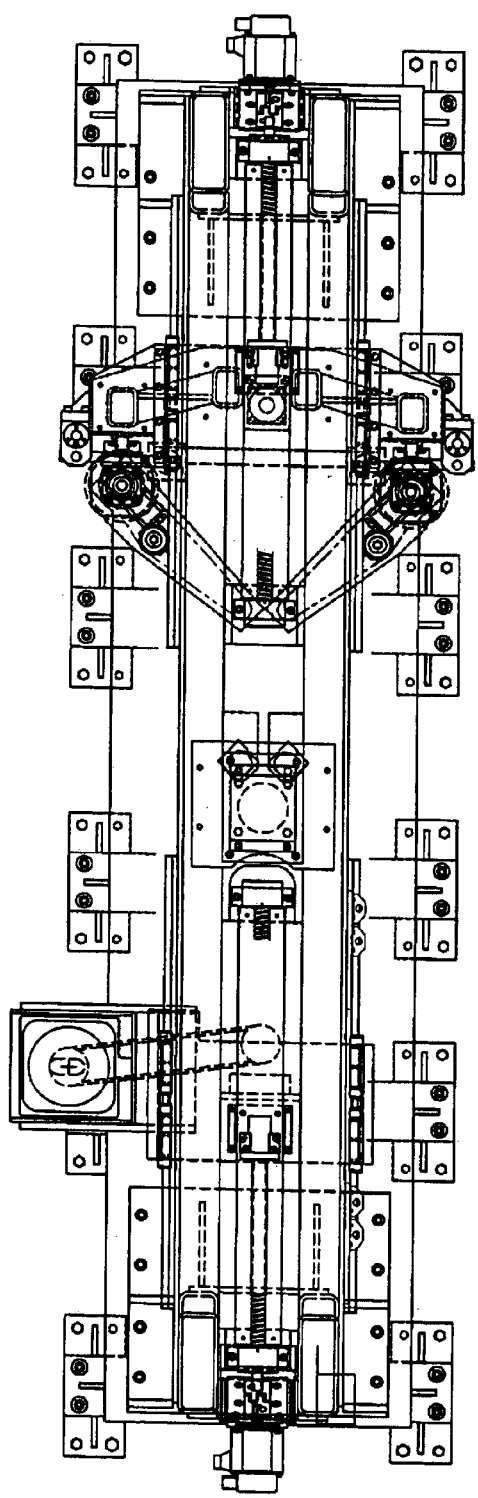
FIG. 4 is a top plan view of the grinder/drill carriage assembly of FIG. 3.

Referring now to FIGS. 3 and 4, the workpiece chuck (30) of the grinder/drill frame (11) is shown. The grinder/drill frame (11) is constructed of legs (34) which are spanned by a bridge (35). Positioned proximate the center of the bridge (35) is a clamp housing (36), mounted to rotate, containing a bore clamp cylinder (37) which is pneumatically driven and has a stroke of six inches or more to provide clearance for loading workpieces onto the grind table (29). Positioned directly beneath the clamp housing (36) and clamp cylinder (37) is the grind table (29) which is driven rotationally by a servo motor (38) through a direct drive and a minimum backlash reducer (40). The grind table (29) includes a vacuum chuck (41) which operates in conjunction with the clamp cylinder (37) to retain a workpiece in its referenced and oriented position for machining. During machine operations, the grind table (29), workpiece, claimp (37), and chuck (41) are rotated by the servo motor (38) to provide rotational movement to the workspace, thereby creating positioning along the Y plane for grinding and drilling operations. The motion in the X plane is provided as follows.

The bridge (35) supports a rotary grind apparatus (42) and a drill apparatus (43) for movement along the X plane on the bridge (35). The rotary grinder (42) and drill apparatus (43), are mounted on the precision linear motion slides (44, 45) respectively. The linear motion of the grinder (42) and drill (43) on the slides (44, 45) are each controlled by AC servo motor (46, 47) respectively, and a directly coupled ball-type lead screw (48, 49) respectively. The lead screws (48, 49) in turn are coupled to the grind apparatus (42) and drill apparatus (43) by ball screw nuts (50, 51) respectively, and are mounted in preloaded, angular contact, high thrust bearings (79) to eliminate end play. Movement along the linear motion slides (44, 45) provides the grinder (42) X plane motion and the drill (43) X plane positioning.

Figure 5:
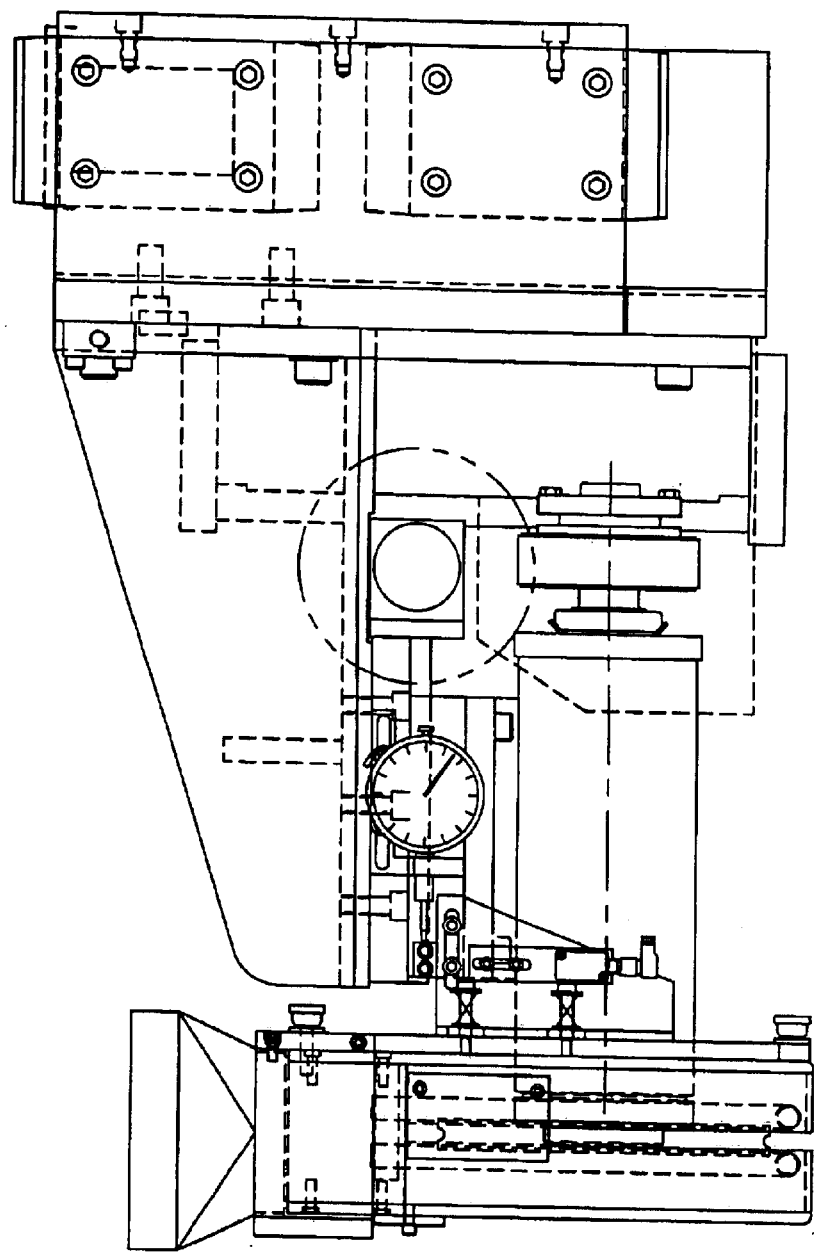
FIG. 5 is a side detail view of the grinder assembly of the machine of FIG. 1.
Figure 6:
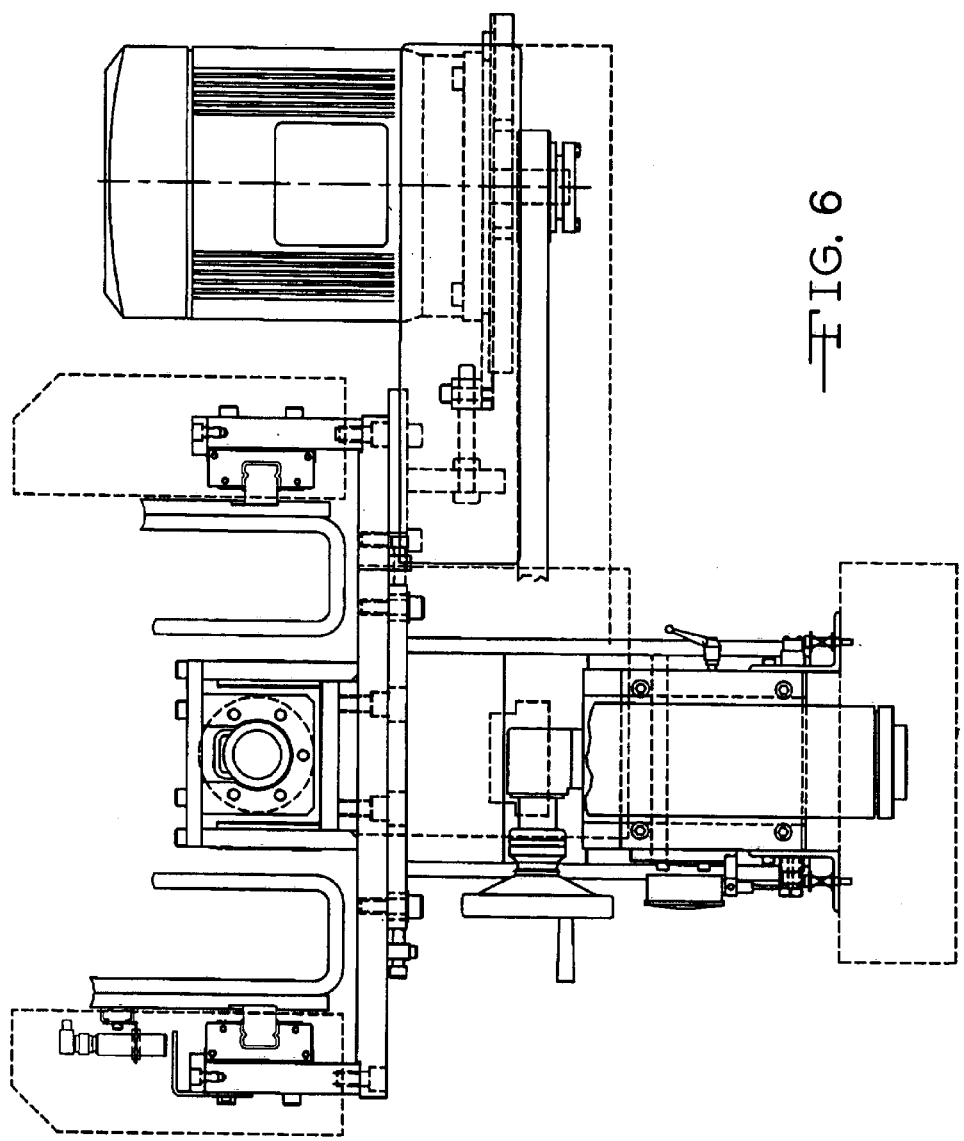
FIG. 6 is a top view of the grinder assembly of FIG. 5.

Preferably, the rotary grinder (42) is a continuous path rotary edge grinder controlled by CNC controls. Referring now to FIGS. 5 & 6, a spindle carriage assembly (52) includes a precision grinding spindle (53) driven by a drive motor (54). A vacuum coolant guard assembly (55) is attached to the spindle to provide coolant directly to the grinding wheel (56). The vacuum guard coolant assembly (55) is designed so that coolant and air are pulled up through the top of the guard thru a mist collector by a flexible hose (not shown). The vertical height of the grinding wheel (56) is adjustable, either automatically, or as shown in the drawings, by a spindle height dial (57). A height indicator (58) is use to gauge the accuracy of the grinding wheel height with regard to the workpiece.

Figure 7:
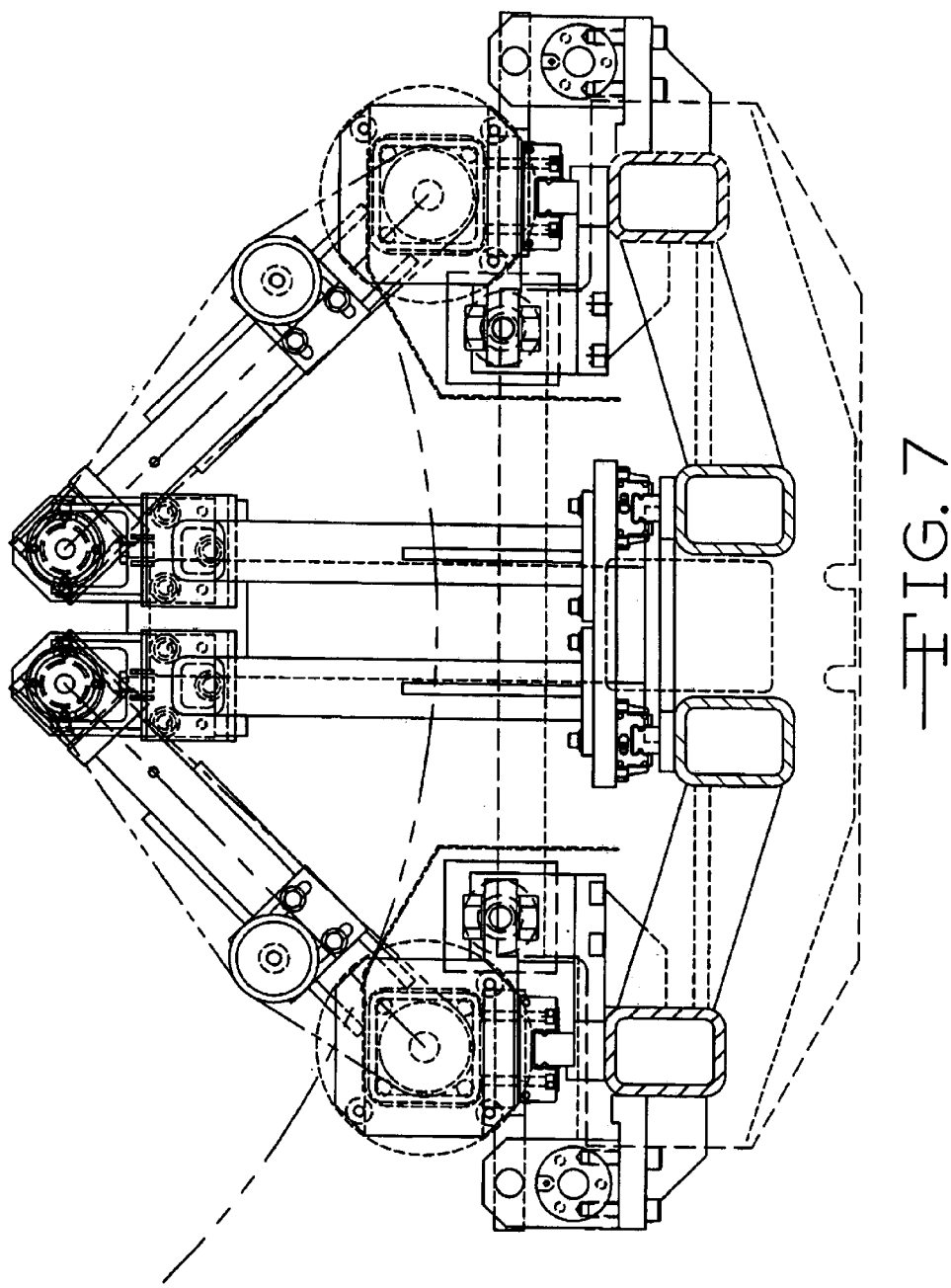
FIG. 7 is a top view of the drill frame and drill head assembly of the machine of FIG. 1.
Figure 8:
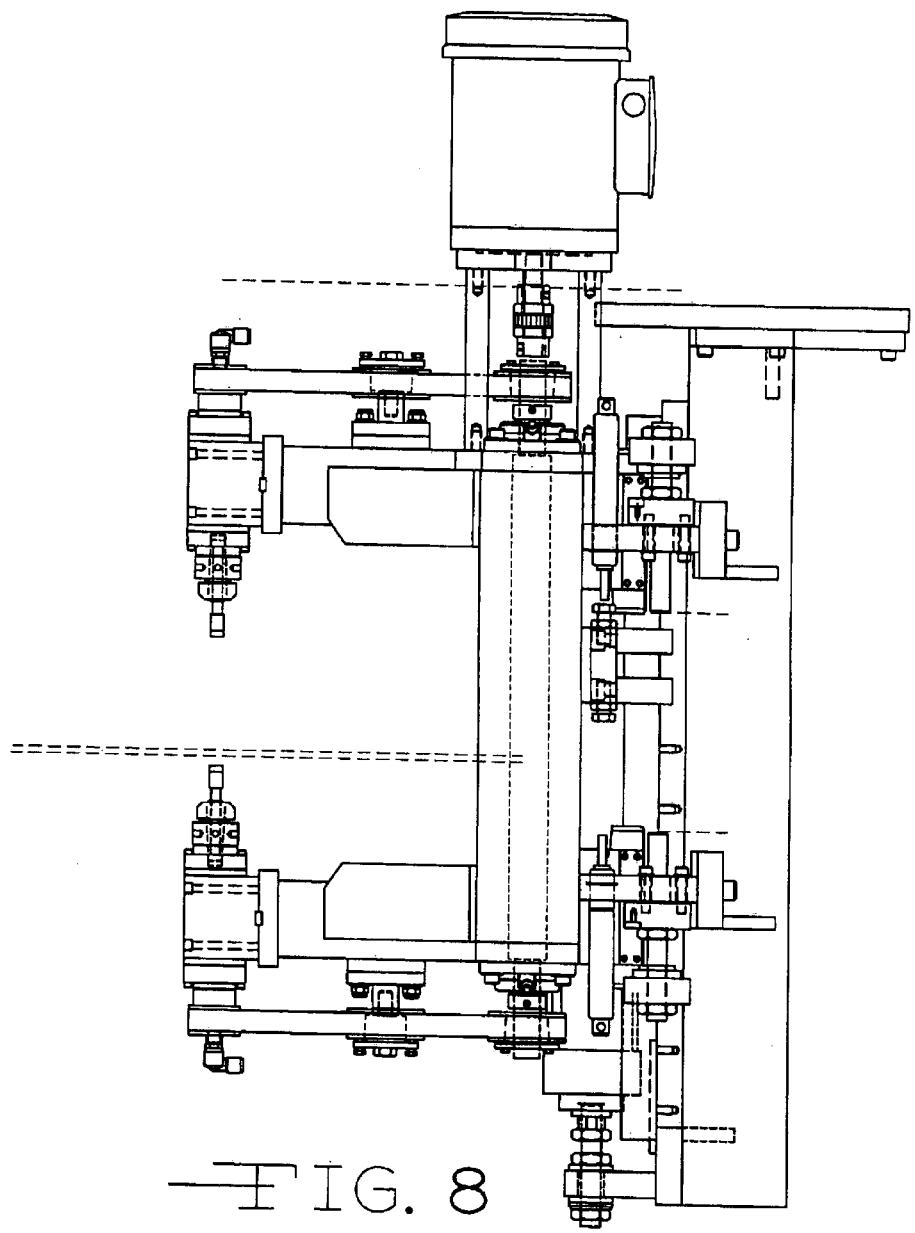
FIG. 8 is a side view of the drill frame and drill head assembly of FIG. 7.
Figure 9B:
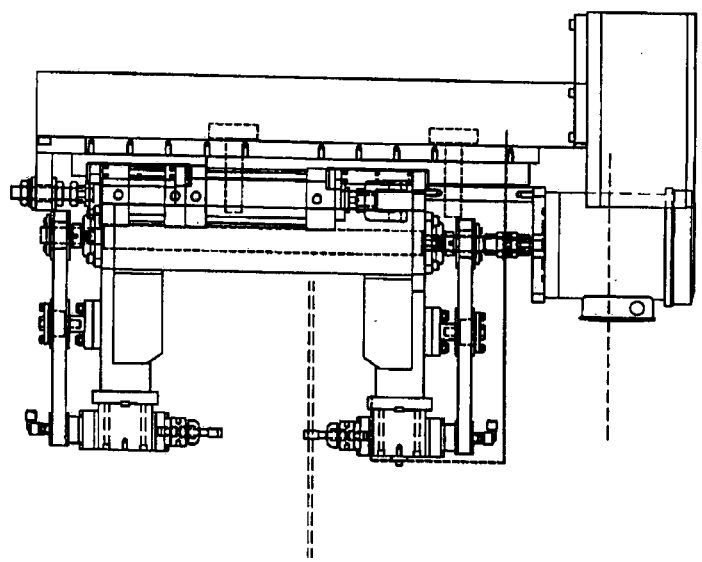
FIGS. 9a and 9b are side view positioning schematics for the drill head assembly showing the positions of the upper and lower drills in contact with the work piece plane.
Figure 9A:
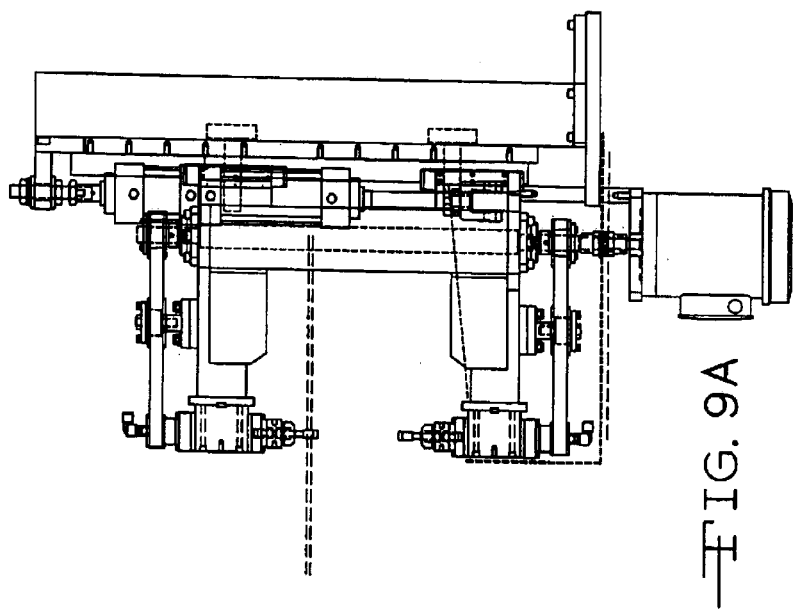

On the opposite side of the grinding drilling bridge (35) is the drill apparatus (43). Referring to FIGS. 7 and 8, a drill carriage (59) is engaged with the precision linear motion slide (45) and carries a main drill frame (60). The main drill frame (60) is mounted to the underside of the drill carriage (59) and includes precision linear rails (80) vertically extending downward toward the grinding table (29). A pneumatic cylinder (62) is engaged with the drill frame (60) to power the drill subframe (63) in vertical movement on the precision rails (61). The drill subframe (63) includes linear bearings for up and down movement on the vertical precision rails (61). The drill subframe (63) carries the drill spindles (64). Preferably, the drill sub frame (63) is cantilevered at the top and the bottom to carry top and bottom drilling spindles (64a, 64b). Each set of drilling spindles is powered by a single AC frequency controlled motor (65). The drill frame (60) is driven on the precision rails (61) by the pneumatic cylinders (62). That way the drill spindles (64) can be positioned at the underside of the workpiece as shown in FIG. 9a or the topside of the workpiece as shown in FIG. 9b. Each drill spindle (64) includes a hydraulic feed check (66) which is used to control the drill feed rate during drilling operations. Hole chamfering can be achieved by slowing down the spindle feed rate. Each drill spindle also includes a positive depth stop (67) which is designed to establish the depth of penetration for both the top and bottom drill spindles (64). The depth stops (67) are adjustable as needed. Coolant water is supplied directly to the spindle drills via rotary joint (81) and necessary valving provided to restrict coolant flow during non-drilling time.

Preferably, the grinding/drilling machine of the present invention incorporates a PC based CNC controller to control all servo motors and axis drives. The CNC controller also controls sequencing of the machine's movements.

The above description of the invention is intended to be illustrative in nature and is not intended to be limited upon the scope of the following claims.

I claim:

1. A glass plate tooling apparatus comprising, in combination:

a machining station having a clamp member for retaining a workplace in a fixed and oriented position on first and second planes;

a machining apparatus carrying at least two machine tools for performing two different operations on the workpiece, each of the machine tools being movable along the first plane; and wherein the machining station rotates on a third plane to provide for two-plane machining of a workpiece rigidly retained in position on the second plane.

2. The glass plate tooling apparatus of claim 1 wherein the machining apparatus includes at least one grinding tool positioned for movement along the first plane.

3. The glass plate tooling apparatus of claim 1 wherein the machining station and the machining apparatus are controlled by a programmable CNC device.

4. A glass plate tooling apparatus comprising, in combination:

a loading/unloading apparatus having a load shuttle for receiving an unfinished workpiece and transferring the unfinished workpiece to a machining station and an unload shuttle for engaging a finished workpiece at the machining station and transferring the finished workpiece away from the machining station;

the machining station including a clamp member for retaining the workpiece in a fixed and oriented position on first and second planes; and a machining apparatus carrying at least two machine tools for performing two different operations on the workpiece; each of the machine tools being movable along the first plane and wherein the machining stations rotates to provide for two-plane machining of a workpiece rigidly retained in position on the second plane;

wherein the load shuttle includes adjustable stops for positioning the workpiece on the first and second planes and the load shuttle maintains the first and second plane positioning when transferring the workpiece to the machining station.

5. The glass plate tooling apparatus of claim 1 further including an infeed conveyor for supplying a workpiece to the load shuttle.

6. The glass plate tooling apparatus of claim 5 wherein the infeed conveyor includes an engagement tool movable along the first plane and the second plane for positioning the workpiece against the load shuttle adjustable stops.

7. The glass plate tooling apparatus of claim 6 wherein the load shuttle and the unload shuttle operate independently and are structurally interrelated so that the load shuttle may be positioned proximate the machining station with an unfinished workpiece at the same time the unload shuttle is positioned proximate the workpiece to engage and remove a finished workpiece.

8. The glass plate tooling apparatus of claim 6 further including an outgoing conveyor located proximate the unload shuttle for receiving finished workpiece and removing them from the tooling apparatus.

9. The glass plate tooling apparatus of claim 7 wherein the ad shuttle is operative to rebrient the finished workpiece and place the finished workpiece in its reoriented position on the outgoing conveyor.

10. The glass plate tooling apparatus of claim 6 wherein the machining apparatus includes at least one grinding tool positioned for movement along the first plane.

11. The glass plate tooling apparatus of claim 6 wherein the machining apparatus further includes a drill tool independent of the grinding tool positioned for movement along the first plane.

12. The glass plate tooling apparatus of claim 11 wherein the drill tool includes at least one topside drill positioned in fixed opposite relationship to at least one fixed bottomside drill, the at least one topside drill and the at least one bottomside drill being fixed to a frame member oriented for movement in the second plane and wherein movement of the frame member along the third plane engages the topside drill with the workpiece and alternatively engages the bottomside drill with the workpiece.

13. The glass plate tooling apparatus for claim 6 wherein the loading/unloading apparatus, the machining station and the machining apparatus are all controlled by a programmable CNC device.

* * * * *